UNITED STATES PATENT OFFICE.

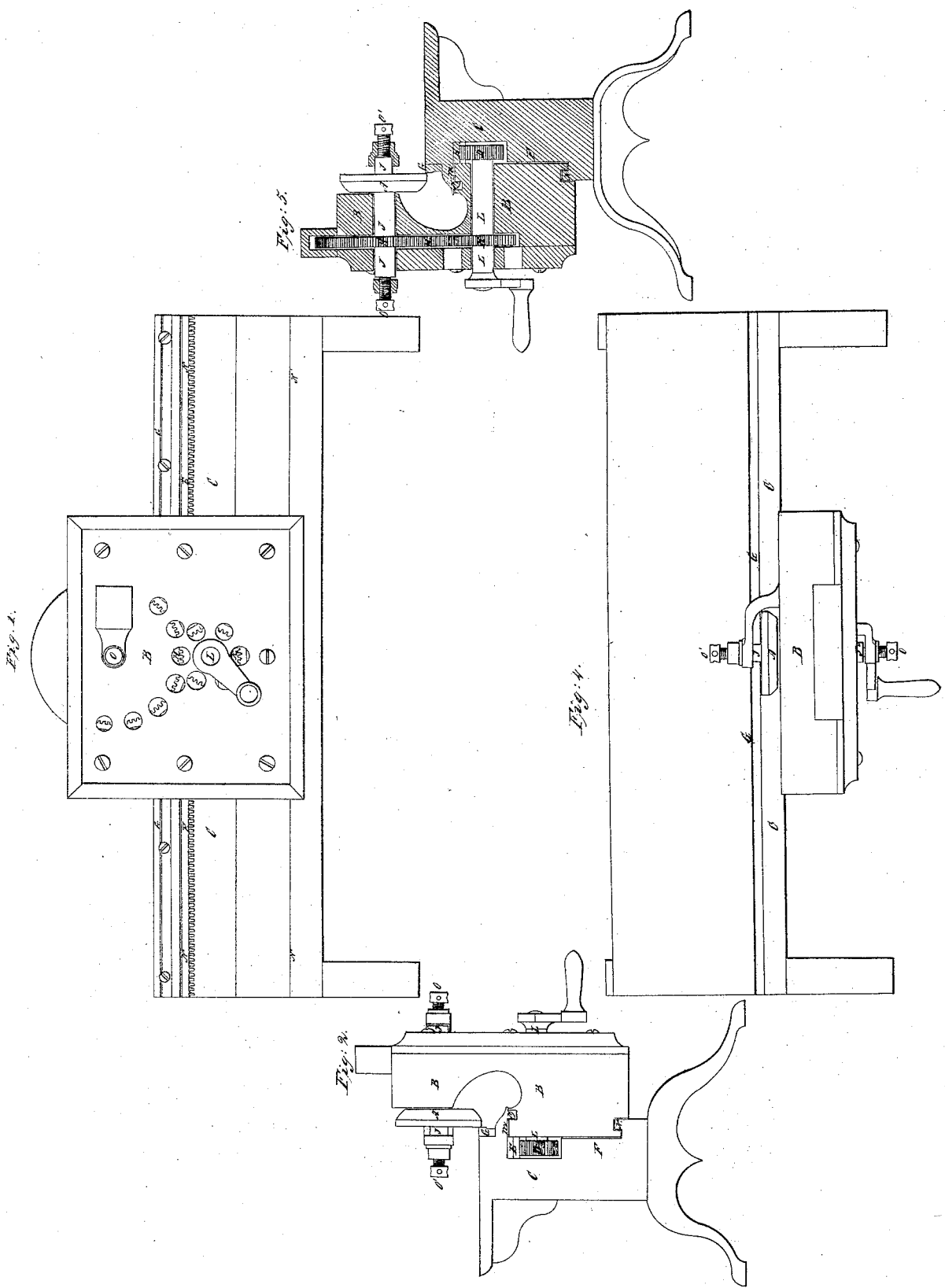

ANSON HARDY, OF DORCHESTER, MASSACHUSETTS.

ROTARY SHEARS.

Specification of Letters Patent No. 16,334, dated January 6, 1857.

*To all whom it may concern:*

Be it known that I, ANSON HARDY, of Dorchester, in the county of Norfolk, State of Massachusetts, have invented certain new and useful Improvements in Rotary Shears for Cutting Metallic and other Sheet Substances; and I do hereby declare that the following is a full, clear, and exact description thereof, reference being therein made to the accompanying drawings, making a part of this specification, in which—

Figure 1, is a longitudinal elevation, Fig. 2, an end elevation, Fig. 3, a transverse section, Fig. 4, a horizontal plan.

Similar letters refer to similar parts in each of the figures.

In rotary shears as heretofore constructed there are two defects which operate against their perfect action, first, the beam over the stationary shear blade or table, is in the way when cutting larger sheets of metal, and the sheets cannot be conveniently turned or handled on this account. Second, there has been no way of regulating the amount of draw, and traversing motion, of the rotary blade or shear, and the consequence is that much power is expending, in producing no advantageous result, for it is obvious that the amount of draw given to the rotating cutter should vary with the thickness of the sheet to be cut, or that for thick plates the rotating shear should have less motion on its axis in proportion to its traveling motion along the table than with thin sheets.

The object of my improvement is to obviate these defects, which I have done, by dispensing with the top beam, and supporting the carriage entirely on the frame that contains the stationary blade—and by so gearing the carriage, and rotary shear blade in it that, their relative velocities can be changed, to produce the amount of drawing cut requisite for the machine to work to the best advantage.

In the accompanying drawings, C is a beam, upon which the carriage B is made to slide in a horizontal direction by means of a pinion D, attached to the shaft L, supported by the carriage B engaging with the rack E attached to the beam C. In a direct line under the cutting edges of the knives G, and A, is a bearing surface M against which the movable carriage B is pressed, by the resistance of the metal being divided, and meets the vertical strain. F is another bearing surface on the beam C, against which the carriage B presses, when in act of cutting and which meets the lateral strain produced by the resistance offered. N and N' are lips upon the beam C whose office is to keep the carriage B in its place and prevent any vibration to its horizontal motion. The movable carriage B supporting the rotary knife A attached to the shaft J, upon which shaft, is the gear H engaging with the pinion K attached to the shaft L. Upon the upper edge of the beam C is the long straight knife G. The rotary knife A is adjusted in a perpendicular line over the straight knife G by means of the screws O and O. The advantages of this position of the bearing surfaces and the gears as described are first, that the beam C allows of no deflection from the resistance offered by the metal under the shears, as is experienced upon the machines now in use which enables me to build a machine for cutting sheets of any length without an upper beam. Secondly by revolving the shaft L upon which is the pinion D, engaging with the rack E, attached to the beam C, the carriage B is made to move horizontally along the beam C. At the same time the rotary knife A, is made to revolve by the gear H attached to the shaft J, engaging with the pinion K, attached to the shaft L, and the relative velocity of the cutting periphery of the rotary knife A, to its horizontal velocity can be regulated by the ratio made to exist between the gear H and the pinion K.

A modification of this machine can be made by the movable carriage receiving its horizontal motion by gears engaging into a rack attached to a beam suspended over the carriage—or by the carriage B resting upon another beam to supply the office of the bearing surface F. But this would be the same principle, as it merely changed the position of the bearing surface to meet the lateral strain; and the beam suspended over the carriage would only serve the office of holding the rack from which the horizontal motion is received.

Having thus fully described the nature of my invention, what I claim therein as new and desire to secure by Letters Patent is—

1. Dispensing with the top beam or support as commonly used, and supporting the carriage on the lower beam to which the straight knife is attached, as herein set forth, by which means I avoid the expense of and objection to, a top beam.

2. I also claim the use of the revolving circular knife when operated by two or more gears, that can be regulated so as to give any amount of drawing cut that may be required.

ANSON HARDY.

Witnesses:
E. W. HOWE,
JACOB HOWE.